(12) United States Patent
Valladares et al.

(10) Patent No.: US 7,558,855 B2
(45) Date of Patent: Jul. 7, 2009

(54) VENDING NETWORK RESOURCES

(75) Inventors: Anthony Valladares, Boise, ID (US); Timothy Blair, Boise, ID (US); Connie Turnbull, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 10/458,487

(22) Filed: Jun. 9, 2003

(65) Prior Publication Data

US 2004/0249908 A1 Dec. 9, 2004

(51) Int. Cl.
G06F 15/16 (2006.01)
(52) U.S. Cl. .............. 709/226; 709/227; 709/228; 709/229; 709/245; 709/246; 707/102; 717/177; 717/178
(58) Field of Classification Search .......... 709/226, 709/227, 228, 229, 245, 246; 707/102; 717/177, 717/178
See application file for complete search history.

(56) References Cited

U.S. PATENT DOCUMENTS

| | | | |
|---|---|---|---|
| 5,909,544 A | | 6/1999 | Anderson, II et al. |
| 6,367,073 B2 * | | 4/2002 | Elledge ............... 717/178 |
| 6,957,261 B2 * | | 10/2005 | Lortz .................. 709/226 |
| 6,976,090 B2 * | | 12/2005 | Ben-Shaul et al. ...... 709/246 |
| 7,089,316 B2 * | | 8/2006 | Andersen et al. ........ 709/229 |
| 2004/0059747 A1 * | | 3/2004 | Olarig et al. ........... 707/102 |
| 2004/0111530 A1 * | | 6/2004 | Sidman ................. 709/245 |

FOREIGN PATENT DOCUMENTS

EP 1168711 A1 1/2002

OTHER PUBLICATIONS

Lars Anderson; "OSS Solutions For Network Operators-White Paper"; Teleca, AU-System; 2002; 26 pgs.

* cited by examiner

Primary Examiner—Jinsong Hu
(74) Attorney, Agent, or Firm—Jack H. McKinney

(57) ABSTRACT

Vending network resources. A method embodiment includes automatically identifying a network resource supplied by a network device. Interface controls for selecting the network resource are then presented, and a multilevel identifier is associated with data identifying an installation file for the network resource.

19 Claims, 16 Drawing Sheets

| ADMINTOOL | _ 🗗 X |
|---|---|
| File Edit View Favorites Tools Help | |
| Back Forward | |
| Address http://administrative_server/admin_tool | |

Printer Locator                                  Desired Attributes

Site:     | Boise  | ◁▷ |           ☐ Color      ☐ Sort
Building: | Admin  | ◁▷ —146      ☐ High Speed ☐ Staple
Floor:    | Main   | ◁▷           ☑ Duplex     ☐ Hole Punch
                                          ⎵—147

Printers in Your Area

[INSTALL]🖱 —148  Reception Area Laser Printer — Laser 4800 MFP

VENDING NETWORK RESOURCES

BACKGROUND

For larger businesses and government entities, deploying new network resources to network users can be a daunting task for IT (Information Technology) personnel. Imagine installing a new network printer and then being required to individually prepare a hundred or a thousand network computers to use the new printer. Allowing or requiring the individual network users to add the new printer to their own computers can remove a huge burden from the IT personnel. To add a printer to a network user's computer, Microsoft Windows provides an "Add printer Wizard." When using the wizard, the network path to the new printer must be identified and then entered. This time consuming for IT personnel, but If the task is left to the individual network users, it is especially prone to errors.

DESCRIPTION OF THE DRAWINGS

FIGS. 16-18 are exemplary screen views of an interface for vending a network resource according to various embodiments of the present invention.

DETAILED DESCRIPTION

Glossary

Figure 1:
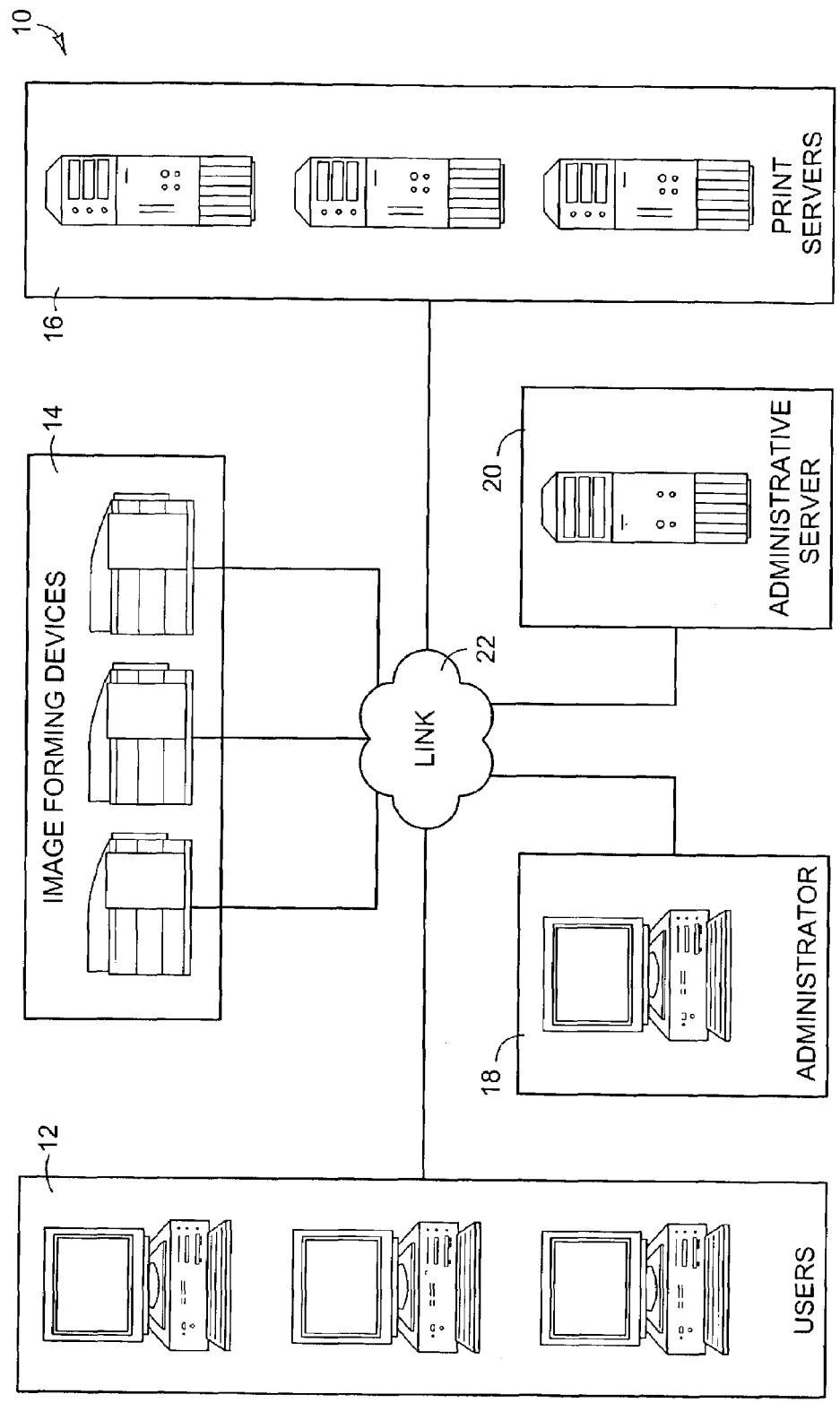
FIG. 1 illustrates an exemplary network environment in which embodiments of the present invention can be implemented.

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components. The term program can refers also to a combination of programs working together. Consequently, a program can have components or modules operating on different but connected computers.

Client—Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for acting on the client request and returning the requested information, if any, back to the client. This requested information may be an electronic file such as a word processing document or spread sheet, a web page, or any other electronic data to be displayed or used by the client. In any given network there may be multiple clients and multiple servers. A single device may contain programming allowing it to operate both as a client device and as a server device. Moreover, a client and a server may both operate on the same device.

Web Server: A server that implements HTTP (Hypertext Transport Protocol). A web server can host a web site or a web service or both. A web site provides a user interface by supplying web pages to a requesting client, in this case a web browser. Web pages can be delivered in a number of formats including, but not limited to, HTML (Hyper-Text Markup Language) and XML (eXtensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface that may be exposed using a variety of protocols layered on top of HTTP, such as SOAP (Simple Object Access Protocol).

Interface: The junction between a user and a computer program providing commands or menus through which a user communicates with the program. The term user in this context represents generally any individual, mechanism, or other program desiring to communicate with the program. For example, in the client-server model defined above, the server usually generates and delivers to a client an interface for communicating with a program operating on or controlled by the server device. Where the server is a web server, the interface can be a web page, a programmatic interface supplied by a web service, or both. A web page, when displayed by the client device, presents a user with interface controls for selecting options, issuing commands, and entering text. The interface controls displayed can take many forms. They may include links, push buttons, radio buttons, text boxes, scroll bars, or pull-down menus accessible using a keyboard and/or a pointing device such as a mouse connected to a client device. In a non-graphical environment, the interface controls may include command lines allowing the user to enter textual commands. The act of presenting interface controls, despite the plural use of the word controls, can include presenting a single interface control as well as presenting multiple interface controls.

Link: A component of an interface that references, for example, another interface, program, or program file. A link when selected directs a user to that which the link references. Where, for example, an interface is a web page, a link may be a hyper-link referencing a program, file and/or another web page. Where an interface designed to allow a user to select an image forming device for printing, the link may be a link to a driver for the image forming device or, perhaps, to a print queue for the image forming device.

Network Device: A device equipped to be accessed remotely over a network by a client. Common examples include servers, printers, scanners, and routers. However, other common household appliances such as refrigerators, microwaves, televisions, stereos, and home security systems can be network devices if properly equipped.

Network Resource: A service supplied by a network device. Often, before a client device can access a network resource, the resource must be added to the client. A print queue, for example, is a network resource supplied by a print server, a network device. To enable the client device access to the print queue, a printer object is added to the client device. A printer object may be or include a link to a driver for the print queue and/or a link to the print queue.

Introduction

Various embodiments of the present invention help to streamline the deployment of network resources. For each new network resource, IT personnel, through an administrator interface, are able to guide the creation of a database entry containing a multilevel identifier for the resource, resource attribute data, and data identifying an installation file for the resource. Once fully populated, the database can contain entries for any number of network resources.

Through a user interface, users are able to enter level data and desired attribute data. Level data and desired attribute data entered using the interface controls are received. Each entry within the database—containing a multilevel identifier matching the level data as well as resource attribute data that is consistent with the desired attribute data—is located. Interface controls are presented for accessing installation files identified by each located entry. The user can then select the control for the desired network resource and that network resource will be added to the user's computer or otherwise made available to the user.

The description that follows is broken into sections. The first section, labeled "components" describes exemplary logical and physical elements used to implement various embodiments of the present invention. The next section, labeled "operation," describes exemplary steps taken to practice various embodiments of the present invention. The last section, labeled "example," describes exemplary implementations of the present invention.

Components

FIG. 1 illustrates network environment 10 in which various embodiments of the present invention may be implemented for vending network resources. The term vending usually relates to distributing an item via a sale—for example, dispensing a cola from a vending machine. However, as used here vend and vending do not require a sale. Vending as used herein is synonymous with dispensing, distributing, or deploying.

Environment 10 includes users 12, image forming devices 14, print servers 16, administrator 18, and administrative server 20. Components 12-20 are interconnected by link 22. Users 12 represent one or more client computers. Image forming devices 14 represent one or more devices capable of forming a printed image on a page. Examples include laser printers, ink printers, copiers, facsimile devices, and multi-function all-in-one devices. Print servers 16 represent one or more network devices running programs for directing print jobs to image forming devices 14. Administrator 18 and administrative server 20 represent computers running programs for use in vending network resources to users 12.

Link 22 represents generally a cable, wireless, or remote connection via a telecommunication link, an infrared link, a radio frequency link, or any other connector or system of connectors that provide electronic communication between users 12, image forming devices 14, print servers 16, administrator 18, and administrative server 20. Link 22 may include an intranet, the Internet, or a combination of both. The portion or portions of link 22 connecting print servers 16 to image forming devices 14 may be different than the portion or portions of link 22 connecting users 12 and administrator 18 to administrative server 20 and print servers 16.

Figure 2:
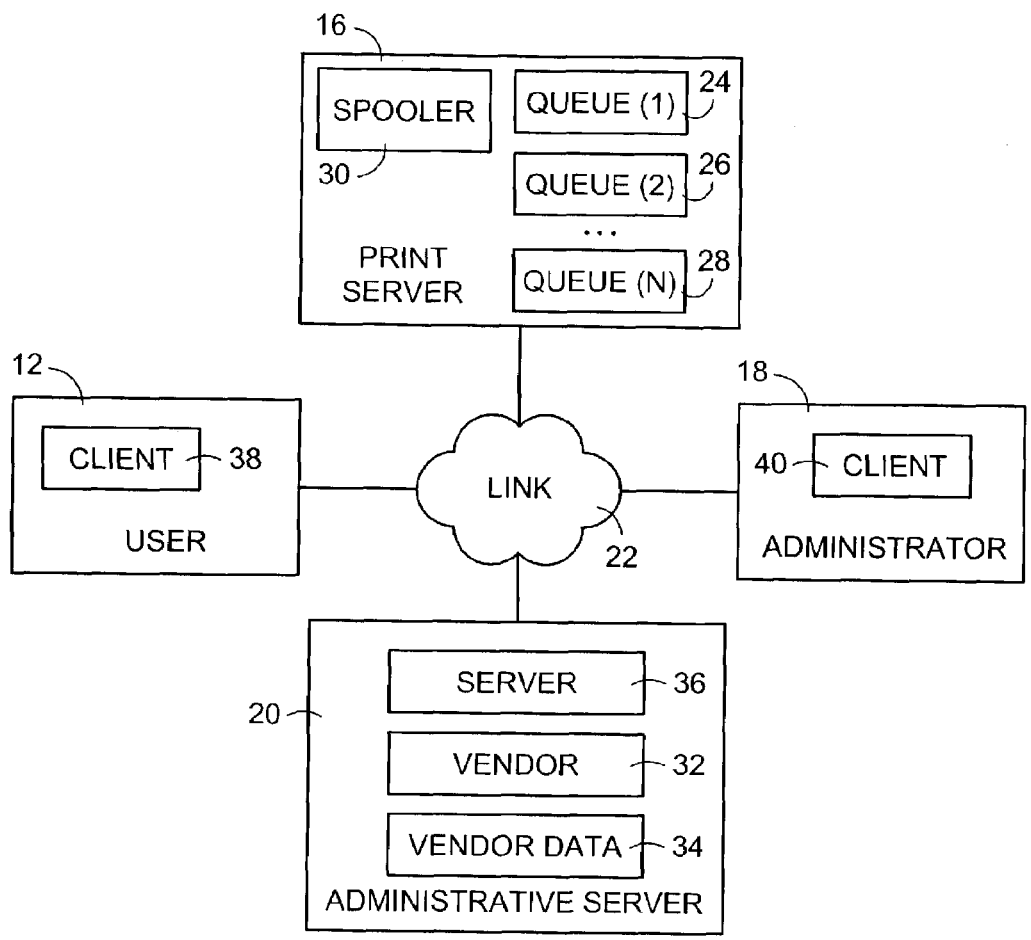
FIG. 2 is a block diagram of the network environment of FIG. 1 according to an embodiment of the present invention.

FIG. 2 is a block of network environment 10 of FIG. 1. FIG. 2 includes only one user 12 and one print server 16, and image forming devices 14 are not shown. Print server 16 includes queues 24-28 and spooler 30. Queues 24-26 are network resources, each providing a temporary electronic holding bin for print jobs directed to a particular image forming device. Spooler 30 represents generally any programming capable of administering print jobs within queues 24-28. For example, spooler 30 receives printing instructions from user 12 directed to a particular image forming device 14 and places them in queue 24, 26, or 28 for that image forming device. As that image forming device becomes available, spooler 30 releases the print jobs one by one to be printed.

Spooler 30 may include print drivers specific to each queue 24-28. The driver for a queue 24, 26, or 28 is a program responsible for translating generic printing instructions received from user 12 into device specific instructions—a print job—capable of being processed by the image forming device associated with that queue 24, 26, or 28. In this case, spooler 30 receives generic printing instructions, converts the instructions into a print job, and places the print job in queue 24, 26, or 28. User 12 may also include one or more drivers allowing the generic printing instructions to be translated into a print job before being received by spooler 30. In this case, spooler 30 receives and directs a print job into the appropriate queue 24, 26, or 28.

Administrative server 20 includes vendor 32, vendor data 34, and server 36. Vendor 32 and vendor data are described in more detail below with reference to FIG. 3. Generally speaking, vendor 32 represents a program capable of vending network resources such as print queues 24-28. Vending includes performing steps needed to make a network resource available to user 12. Vendor data 34 represents the electronic data used by vendor 34. Server 36 is responsible for making vendor 32 available to user 12 and administrator 18.

User 12 includes client 38, and administrator 18 includes client 40. Clients 38 and 40 represent programs capable of facilitating communication with vendor 32 via server 36. Where, for example, server 36 is a web server and vendor 32 is a web service, clients 38 and 40 may be web browsers.

It is noted that in another embodiment, network environment 10 may include other network devices supplying different network resources. In such cases, administrative server 20 could include other vendors and different vendor data specific to vending those network resources. FIG. 2 merely provides an example of vending network resources that happen to be print queues.

Each queue 24, 26, and 28 is associated with and can be identified by its own network address. A print job or printing instructions directed to a particular queue 24, 26, or 28 is directed to the network address for that queue 24, 26, or 28. Queues 24-28 and any other type of network resource can be identified in other manners. They can be identified based upon physical location. For example, a print queue can be identified by the physical location of the image forming device with which it is associated. Network resources can be identified by function. Image forming devices can be distinguished from scanners. Similar resources can be distinguished from one another based upon capability. For example, one print queue can be identified as a queue associated with a color laser printer. Another print queue can be identified as being associated with a high-speed laser printer capable of sorting and duplexing.

Figure 3:
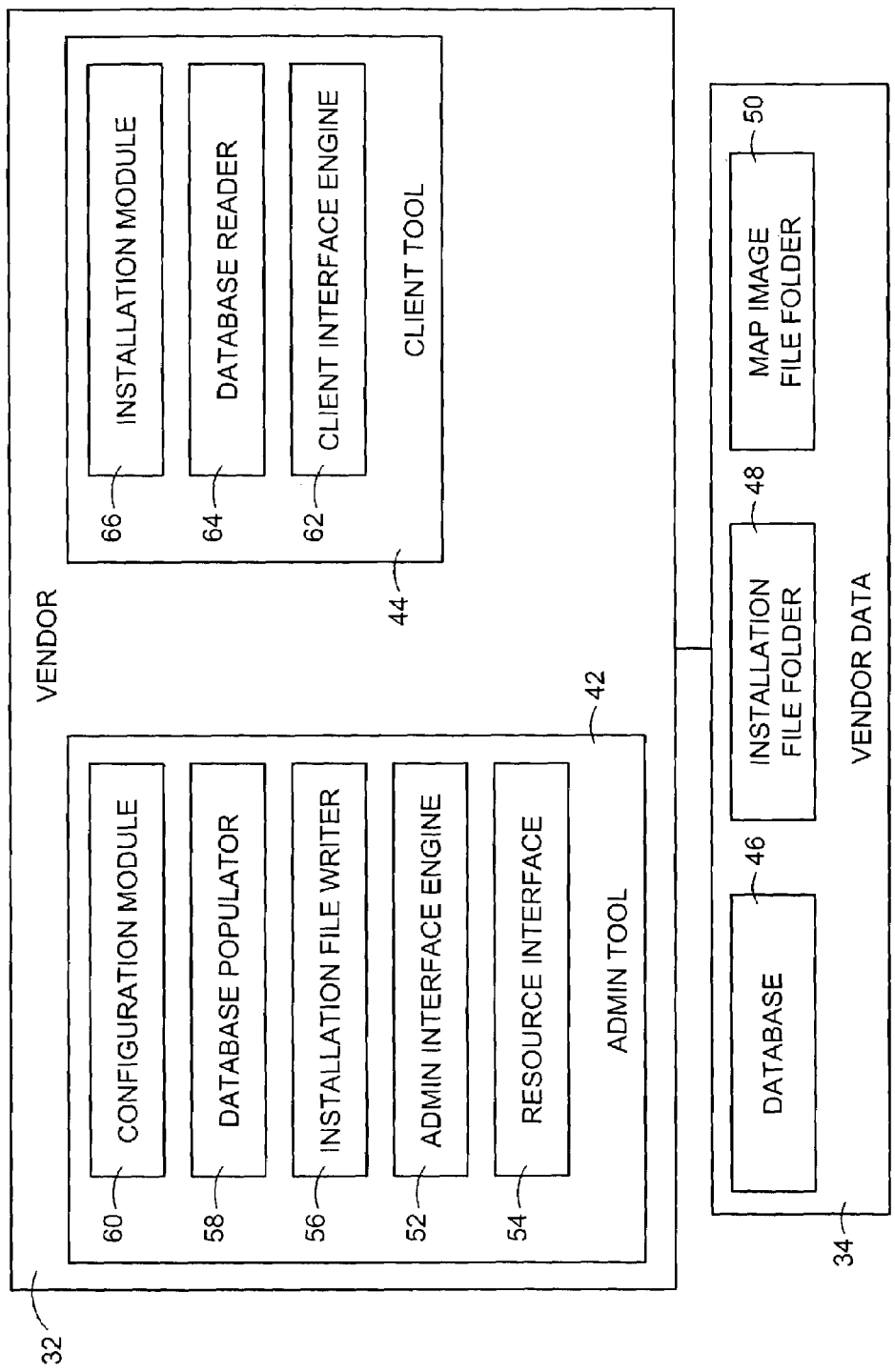
FIG. 3 is a block diagram illustrating a vendor and vendor data according to an embodiment of the present invention.
Figure 4:
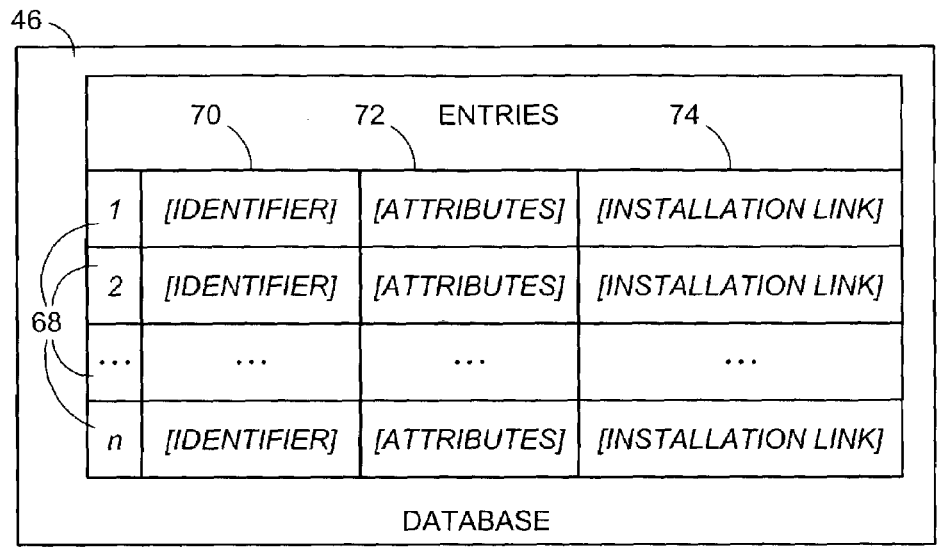
FIG. 4 a block diagram of a vendor database according to an embodiment of the present invention.

FIG. 3 is a block diagram illustrating the program elements of vendor 32 and the contents of vendor data 34 according to an embodiment of the present invention. Vendor 32 includes admin tool 42 and client tool 44. Vendor data includes database 46, installation file folder 48, and map image file folder 50. Database 46, described in more detail with reference to FIG. 4, represents a collection of entries. Installation file folder 48 represents memory for storing installation files (defined below). Similarly, map image folder represents memory used to store map images (also defined below).

Admin tool 42 represents a program capable of identifying and preparing a network resource for vending. To perform its function, admin tool 42 associates network resources with multilevel identifiers. Multilevel identifiers are associated with network resources so that similarities and differences between network resources can be discerned based solely on the multilevel identifier itself. A multilevel identifier is a many-to-one identifier constructed or assembled from two or more ranked level data. Closely related network resources are each associated with the same multilevel identifier. Less closely related network resources are associated with a different multilevel identifier. However, those identifiers may share common level data.

The particular relationship among the network resources helps to determine the structure and ranking of the level data. For example, where the relationship is based upon the geography of a business, the level data may be ranked by site, building, and floor. Each network resource common to a given site will have a multilevel identifier that includes level data for that site. Each network resource common to a building in a given site, will have a multilevel identifier that includes level data for that building and level data for that site. Each network resource common to a floor of a given building in a given site, will have a multilevel identifier that includes level data for that floor, level data for that building, and level data for that site. In this manner, all network resources for a given floor in a given building, at a given site can be located through multilevel identifiers assembled from level data for that floor, that building, and that site.

In another example, where the relationship between the network resources is based on resource function, the level data may be ranked by device type and attributes. Each network resource sharing a device type, like a printer, for example, will have a multilevel identifier that includes level data for a printer. Of the printers that can print in color, each will also have a multilevel identifier that includes level data for a printer and level data for color printing.

In the example of FIG. 3, admin tool 42 includes resource interface 54, admin interface engine 52, installation file writer 56, database populator 58, and configuration module 60. Resource interface 54 represents a program capable of communicating with a given network device to identify network resources supplied by that device as well as network addresses for those resources. Resource interface 54 is also responsible for communicating with or through a network device to ascertain the attributes of a selected network resource. Resource attributes are the characteristics of a resource. For example, attributes of a laser printer may include color printing, duplexing, stapling, sorting, hole punching, and binding among many others. A print queue may have knowledge of the attributes of an image forming device with which it is associated. A print queue can also know and supply a network address for that image forming device, allowing resource interface 54 to communicate directly with the image forming device. Attributes can also be ascertained from an MIB (Management Information Base) established for the image forming device.

Admin interface engine 52 represents a program capable of presenting interface controls that, when displayed, allow the entry of level data, allow the selection of an available network device, and allow the selection of a particular network resource supplied by the identified network device. Admin interface engine 52 may also be responsible for presenting interface controls for identifying or selecting a map image from map images 50 and for positioning a network resource within a selected map image.

A map image is an electronic file that when displayed shows a map of a particular location corresponding to a particular multilevel identifier. For example, a map image may be a floor plan of a particular building. Positioning involves identifying a location in a map image that is associated with a network resource. Where the network resource is a print queue, positioning may include identifying, in the map image, the location of an image forming device associated with the print queue. Admin interface engine 52 may present the interface controls noted above in one or more web pages or other suitable interfaces.

Installation file writer 56 represents a program capable of creating and/or saving in installation file folder 48, an installation file for a network resource identified using interface controls presented by admin interface engine 52. An installation file is a program that, when executed, enables or facilitates access to a network resource. For example, where a network resource is a print queue, the installation file may install a print object for the queue. It may also install a print driver for an image forming device associated with the print queue. Installation files can take many forms. For example, they can be executable files or hypertext applications. A hypertext application is a program that can be downloaded and then executed by a browser.

Operating systems like Microsoft Windows supply an "add printer wizard" that installs a print queue after its network address has been manually identified. When creating or saving an installation file, installation file writer 56 embeds the network address for the network resource in the installation file. When the installation file is later executed, the network resource can be installed without requiring manual identification of the network address.

Database populator 58 represents a program capable of populating database 46 with entries each containing a multilevel identifier, resource attribute data, and data identifying an installation file. Database populator 58 is responsible for assembling a multilevel identifier from level data entered using interface controls presented by admin interface engine 52. Resource attribute data is data identifying the attributes of a particular network resource as ascertained by resource interface 54. Data identifying the installation file may be a link to a particular installation file stored in installation files 48. Data identifying the installation file may also include a link to a map image and positioning data for that link. Positioning data, obtained from admin interface engine 52, identifies the placement of the link to the installation file within the map image. For example, positioning data may define the coordinates of a window within a map image—the window corresponding to a location of the network resource. It is noted that a network resource such as a print queue is often physically separated from its associated image forming device. In this case the location of the network resource can be identified as the location of the image forming device.

Configuration module 60 represents a program for configuring the level data used to assemble multilevel identifiers. Configuration module 60 is responsible for presenting interface controls for determining the number of levels of data needed, ranking of the level data, and providing a description for each level. The number of levels of data needed corresponds directly to the number of levels in a multilevel identifier. It may, for example, be determined that a four level identifier is required to identify the physical location corresponding to a network resource. Configuration module 60 then dictates the description and number of interface controls for entering level data presented by admin interface engine 52.

Client tool 44 represents a program capable of vending network resources made available by admin tool 42. Client tool 44 includes client interface engine 62, database reader 64, and installation tracker module 66. Client interface engine 62 represents a program capable of presenting interface controls for selecting level data and controls for selecting desired attribute data. Client interface engine 62 may present the interface controls noted above in one or more web pages or other suitable interfaces.

Database reader 64 represents a program capable of identifying within database 46 a set of entries each containing a multilevel identifier matching level data selected using interface controls presented by client interface engine 62. From the identified set of entries, database reader 64 identifies a subset of entries each containing resource attribute data that is consistent with desired attribute data selected using interface controls presented by client interface engine 62. To match selected level data, a multilevel identifier need only be assembled from level data matching the particular level data selected. For example, where a multilevel identifier identifies a physical location corresponding to a network resource by site, building, and floor, level data identifying the site and building may be selected, but not level data identifying the floor. Any multilevel identifier that can be assembled, at least in part, from level data identifying that site and that building matches. For resource attribute data to be consistent with desired attribute data, the desired attribute data must not identify attributes that are not identified by the resource attribute data. For example, desired attribute data may indicate color printing and duplexing. So long as the resource attribute data for an entry also indicates color printing and duplexing, the two are consistent. Should desired attribute data identify an attribute not identified by resource attribute data, the two are not consistent. Where no desired attribute data is selected, the sub set of entries is the same as the set of entries.

From each entry in the identified subset, database reader 64 acquires and presents data identifying an installation file to client interface engine 62. Client interface engine 62 then, using the data identifying the installation files, presents interface controls for accessing the identified installation files. Client interface engine 62 may do so by positioning links to the installation files in a map image corresponding to a multilevel identifier matching the selected level data. Alternatively, client interface engine 62 may simply present the links.

Installation tracker module 66 represents a program capable of determining if a network resource has been previously installed. Upon detecting that a particular network resource has been installed, installation tracker module 66 instructs client interface engine 62 not to present an interface control for accessing an installation file for that network resource.

FIG. 4 helps to illustrate an example of database 46. In FIG. 4, database 46 includes a number of entries 68, each associated with a network resource. Each entry 68 includes data in a number of fields 70-74 filled by database populator 58 (FIG. 3). For a given entry 68, field 70 contains a multilevel identifier corresponding to the network resource associated with that entry 68. It is noted that field 70 could in fact be made up of subfields, each containing level data used to assemble the multilevel identifier. Adding a multilevel identifier to database 46 can then also include adding level data to the appropriate subfields. Field 72 contains resource attribute data for the network resource. Field 74 contains data identifying an installation file for the network resource. As noted above, the data identifying an installation file may be a link to the installation file. It may also include data identifying a map image as well as coordinates related to positioning the link within the map image. In many cases, the position of the link will correspond to a position of the network resource. The data identifying a map image can be a link to the map image.

Figure 5:
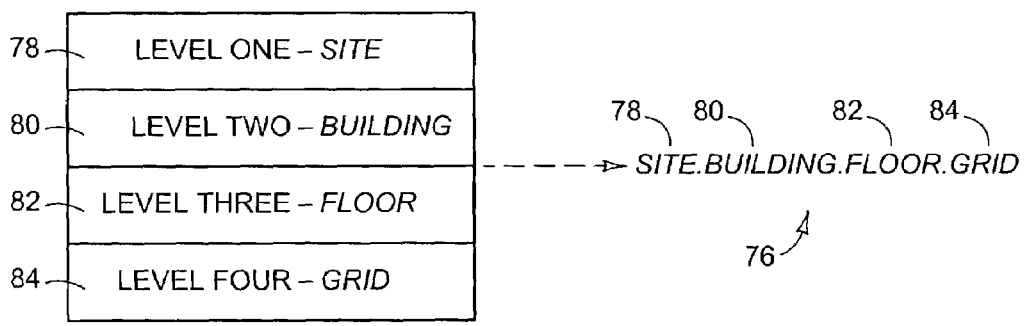
FIG. 5 schematically illustrates an example of a multilevel identifier.

FIG. 5 helps illustrate an example of a multilevel identifier 76 used to identify a network resource based upon location. Multilevel identifier 76 is assembled from level data 78-84. In this example, there are four tiers of level data ranked site, building, floor, and grid. Level data 78 identifies the site corresponding to the network resource. All network resources for a given site will have identical level data 78. Level data 80 identifies the building within a site corresponding to the network resource. All network resources for a given building will have identical level data 78 and 80. Level data 82 identifies the floor within a building corresponding to the network resource. All network resources for a given floor will have identical level data 78, 80, and 82. Level data 84 identifies the grid on the floor corresponding to the network resource. All network resources for a given grid will have identical level data 78, 80, 82, and 84.

The diagrams of FIGS. 2-5 show the architecture, functionality, and operation of various embodiments of the present invention. Each block may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Operation

Figure 6:
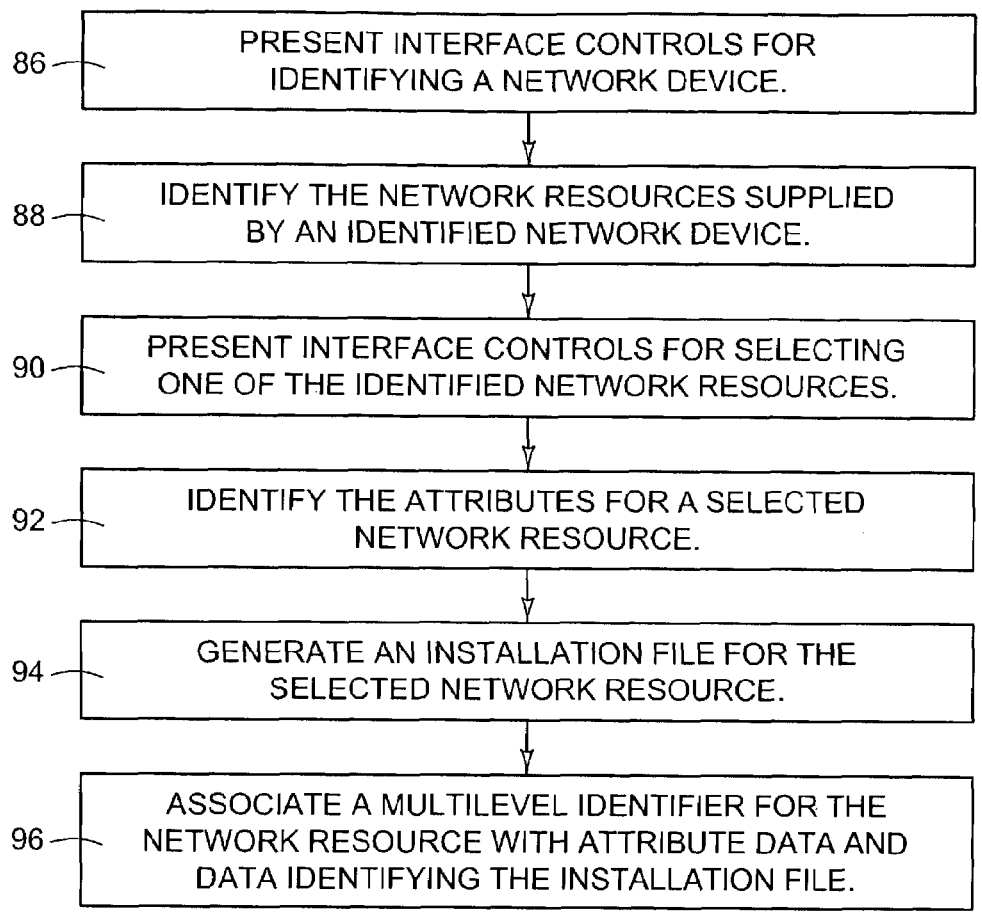
FIG. 6 is an exemplary flow diagram illustrating steps for preparing a network resource for vending according to an embodiment of the present invention.
Figure 7:
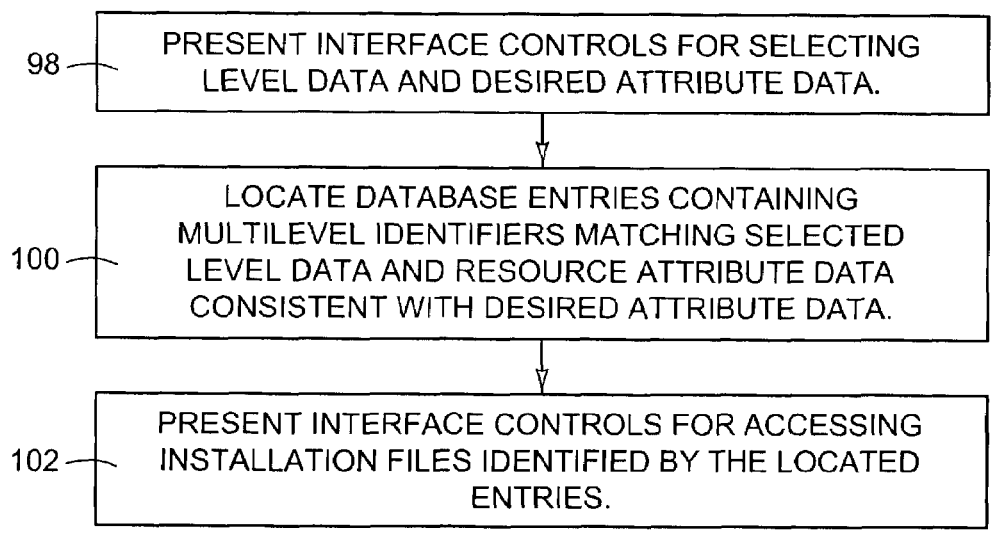
FIG. 7 is an exemplary flow diagram illustrating steps for vending a network resource according to an embodiment of the present invention.
Figure 8:
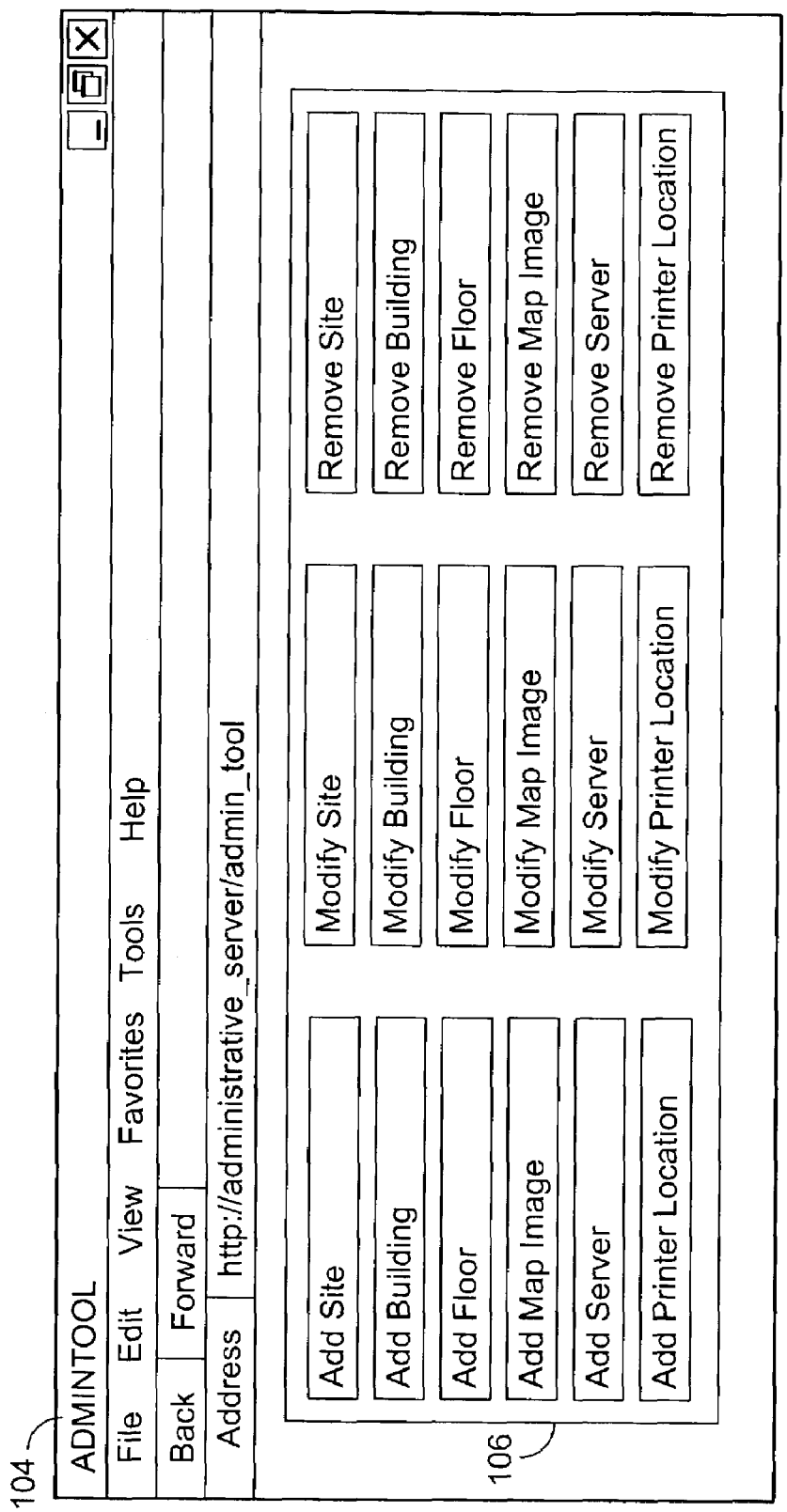
FIGS. 8-15 are exemplary screen views of an interface for populating a vendor database according to various embodiments of the present invention.

The operation of embodiments of the present invention will now be described with reference to the exemplary flow diagrams of FIGS. 6 and 7. FIG. 6 illustrates an example of steps taken to prepare a network resource for vending. FIG. 7 illustrates an example of steps taken to vend a network resource.

Starting with FIG. 6, interface controls are presented for identifying a network device (step 86). Referring back to FIGS. 2 and 3, step 86 can be accomplished by admin interface engine 52. Where server 36 is a web server, client 40 browses to a network address for admin tool 42. Server 36 receives and presents the request to admin tool 42 that in turn presents the interface controls to client 40 in a web page. Selections made using the controls are returned to admin tool 42 via server 36.

Once a network device is identified, one or more network resources supplied by that network resource are identified (step 88). Referring back to FIG. 3, step 88 may be accomplished by resource interface 54 that, for example, may perform the task by communicating with and querying the identified network device. Interface controls for selecting one of the identified network resources are presented (step 90). Again, step 90 may be performed by admin interface engine 54.

Attributes for a selected network resource are then identified (step 92). Referring back to FIG. 3, step 92 may be accomplished by resource interface 54 that, for example, may perform the task by accessing an MIB (Management Information Base) for the network resource or by communicating with and querying the network resource.

An installation file for the selected network resource is generated (step 94). Step 94 may be performed by installation file writer 56 (FIG. 3). A multilevel identifier for the selected network resource is then associated with resource attribute data and data identifying the installation file for the network resource (step 96). Referring to FIGS. 3 and 4, database populator 58 can accomplish step 96 by adding a new entry 68 to database 46.

Referring now to FIG. 7, to vend a network resource, interface controls for selecting level data and desired attribute data are presented (step 98). Referring back to FIGS. 2 and 3, step 98 can be accomplished by client interface engine 62. Where server 36 is a web server, client 38 browses to a network address for client tool 44. Server 36 receives and presents the request to client tool 44 that in turn presents the interface controls to client 38. Selections made using the controls are returned to client tool 44 via server 36.

Using selections made through the interface controls presented in step 98, database entries are located that contain multilevel identifiers matching selected level data and resource attribute data consistent with desired attribute data (step 100). Referring back to FIGS. 3 and 4, database reader 64 can accomplish this by searching database 46. Upon locating an entry or entries 68 meeting these criteria, database reader 64 acquires, from each located entry, data identifying an installation file and supplies that data to client interface engine 62.

Interface controls for accessing installation files identified by the entries located in step 100 are presented (step 102). Step 102 may be performed by client interface engine 62. Where the data identifying an installation file is a link to the installation file, step 102 involves presenting the link in a web page or other suitable interface. Where the data identifying the installation file also includes data identifying a map image and coordinates for positioning the link to the installation file, step 102 involves presenting the map image with the link to the installation file positioned in the map image according to the coordinates.

Although the flow charts of FIGS. 6 and 7 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

EXAMPLES

FIGS. 8-18 are exemplary screen views of interfaces used to prepare a network resource, in this case a print queue, for vending and for vending the print queue. FIGS. 8-15 show various instances of admin tool interface 104 used to prepare a print queue for vending. Starting with FIG. 8, admin tool interface 104 includes database population controls 106. Database population controls 106 are used to add, modify, and delete multilevel identifiers, map images, print servers, and printer locations. Referring back to, FIG. 3, admin tool interface 104 is presented to client 40 by admin interface engine 52. Client 40 can then return selections entered through admin tool interface 104.

Figure 9:
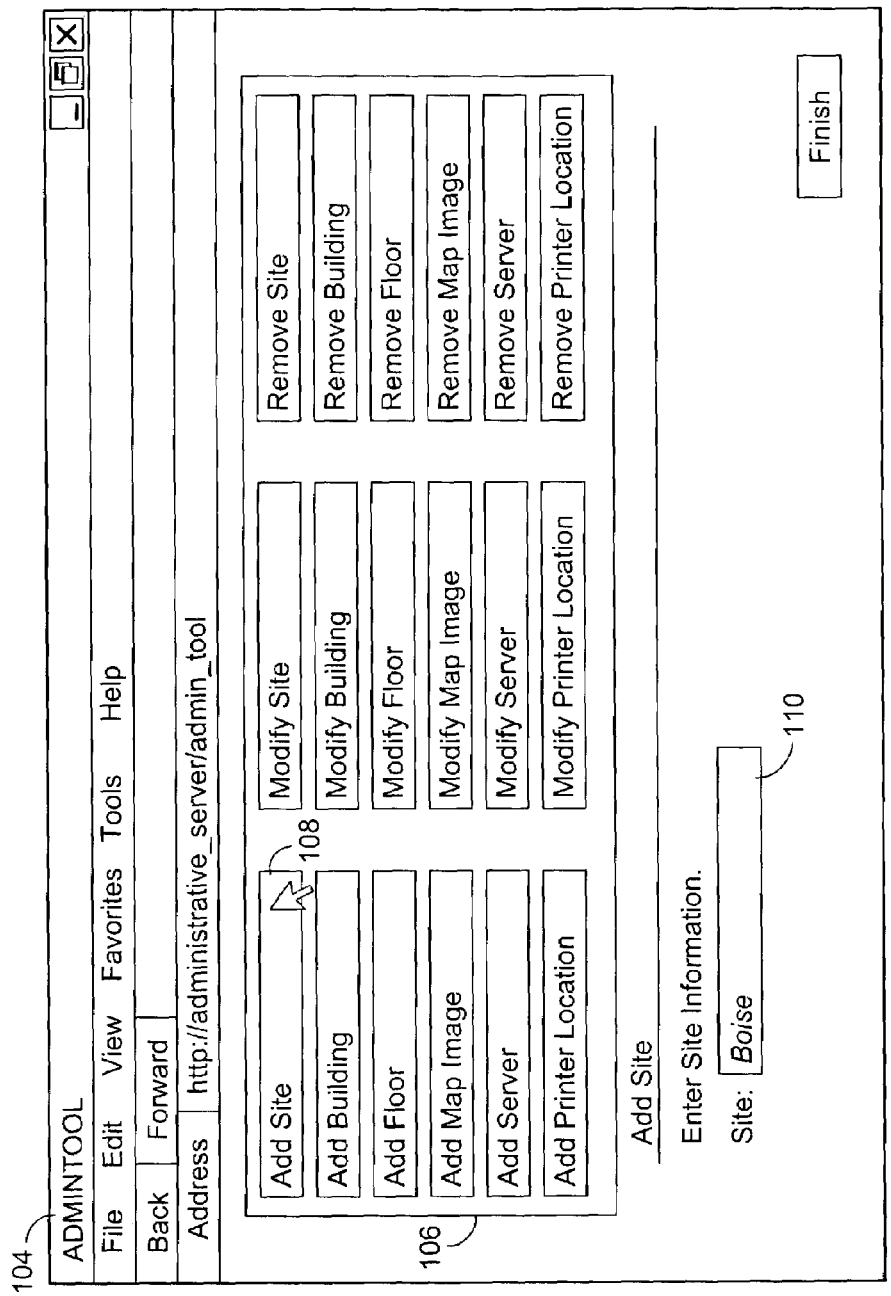

Referring to FIG. 9, add site control 108 has been selected. As a result, admin interface engine 52 presented interface controls 110 for entering level data identifying a site. Here, "Boise" has been entered and returned by client 40.

Figure 10:
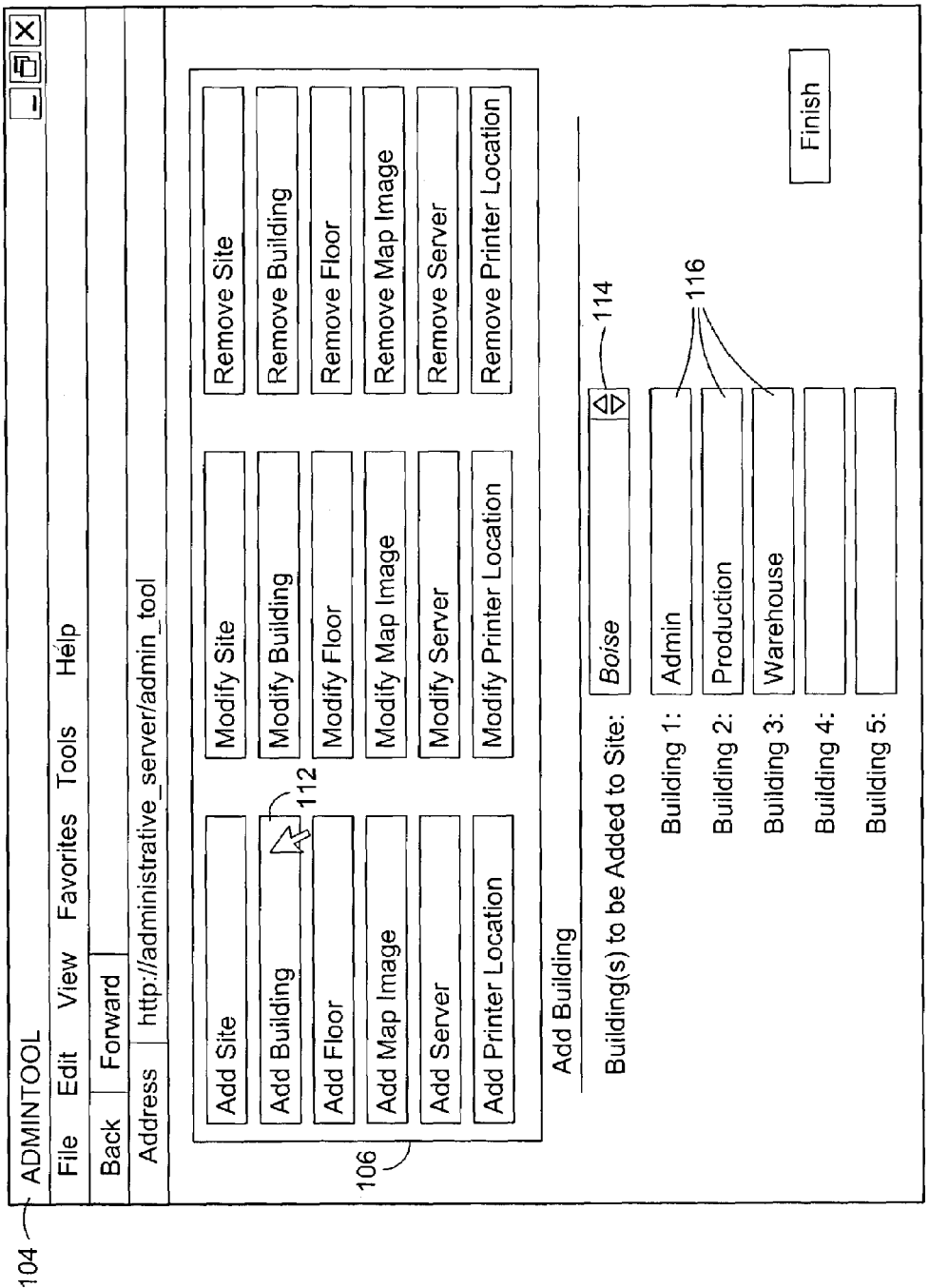

Referring now to FIG. 10, add building control 112 has been selected. In response, admin interface engine 52 returned interface controls 114 and 116 for entering level data for buildings for the BOISE site.

Figure 11:
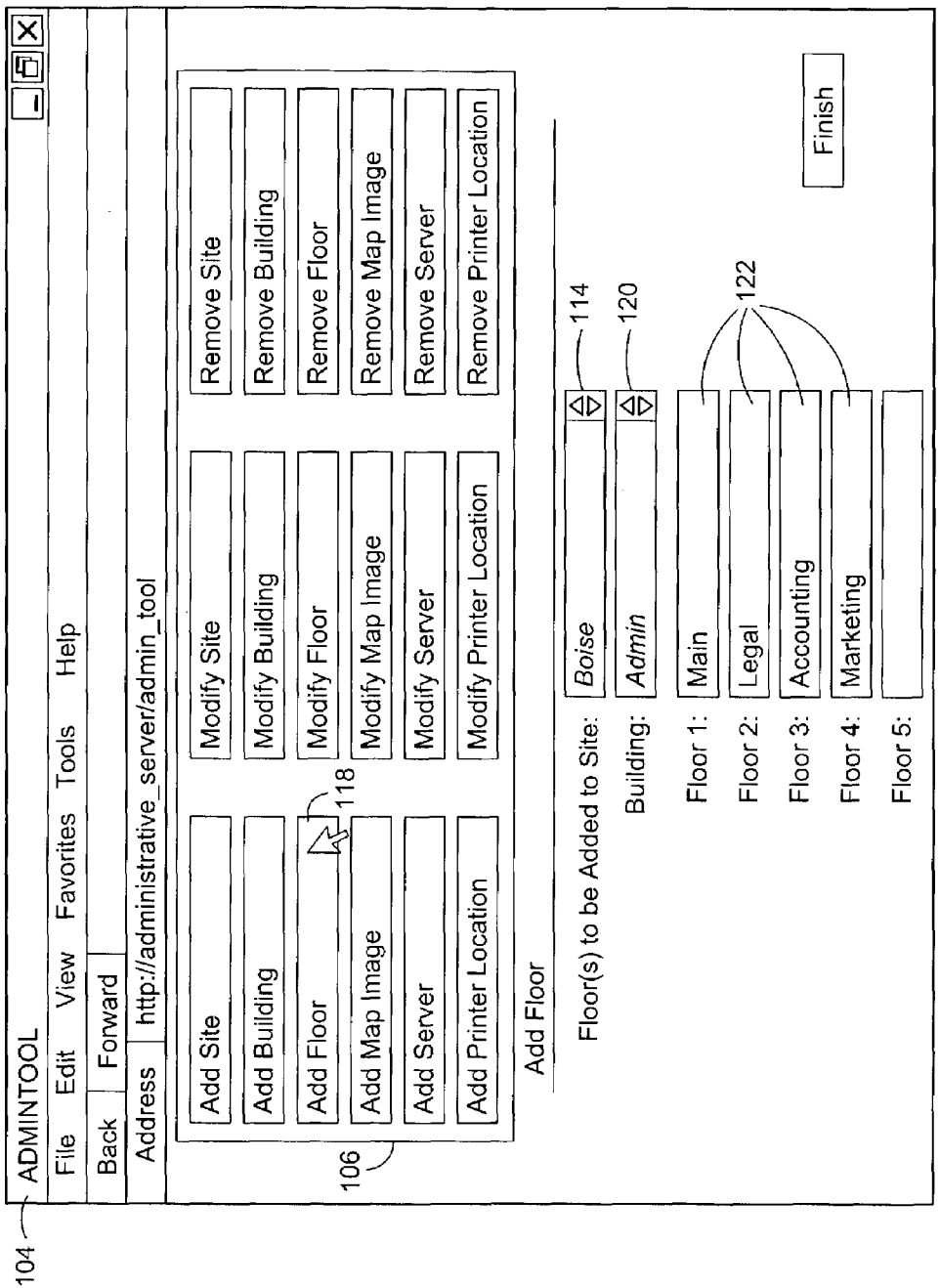

In FIG. 11, add floor control 118 has been selected. Admin interface engine 52, in response, has presented controls 114, 120, and 122 for entering level data floors in the ADMIN building in the BOISE site. From the level data entered in FIGS. 8-11, database populator 58 can assemble one or more multilevel identifiers.

Figure 12:
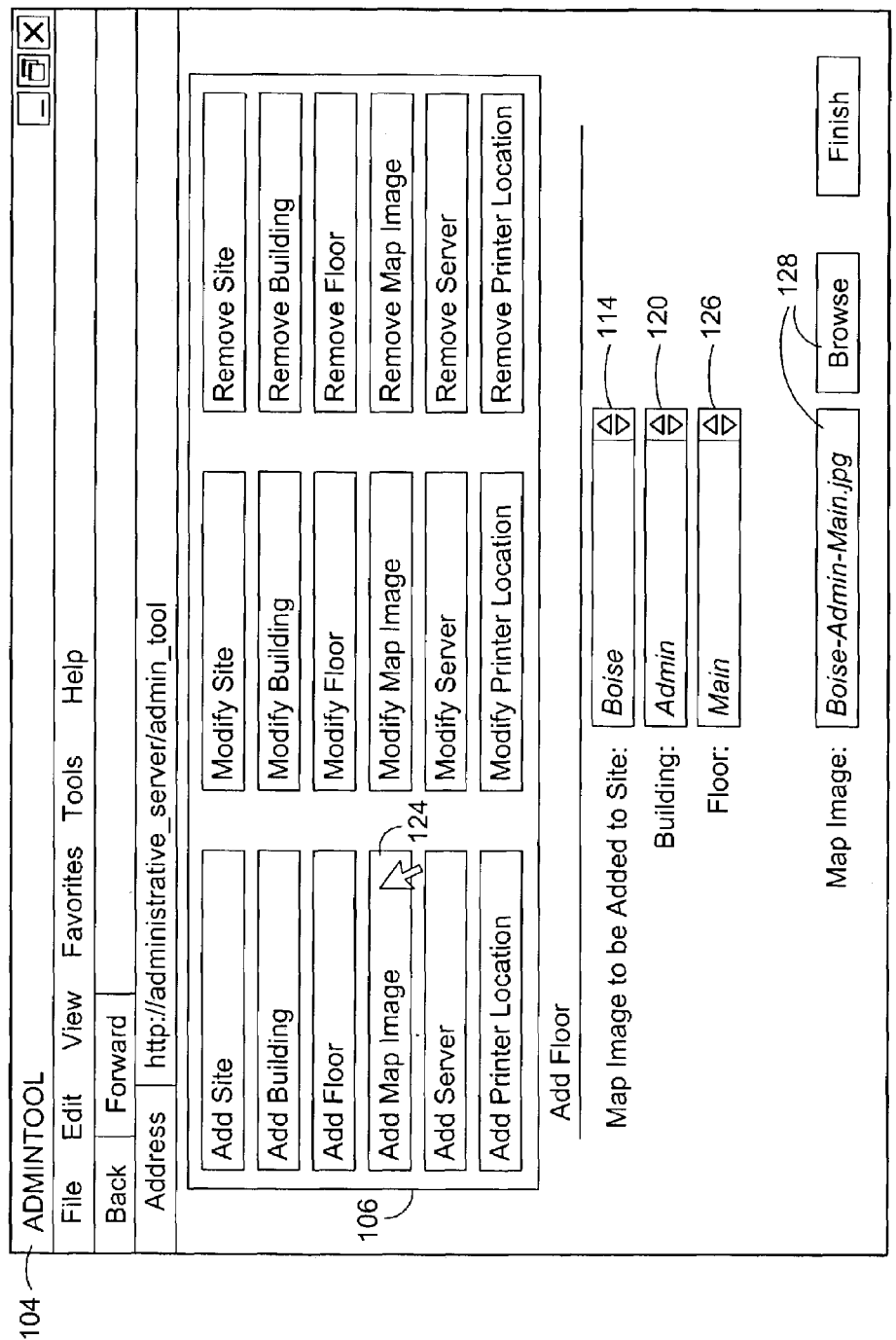

Referring now to FIG. 12, add map image control 124 has been selected. In response admin interface engine 52 presented interface controls 114, 120, 126, and 128 for identifying a map image. More specifically, interface controls 128 allow the identification of a map image corresponding to a multilevel identifier assembled from level data identified or selected using controls 114, 120, and 126.

Figure 13:
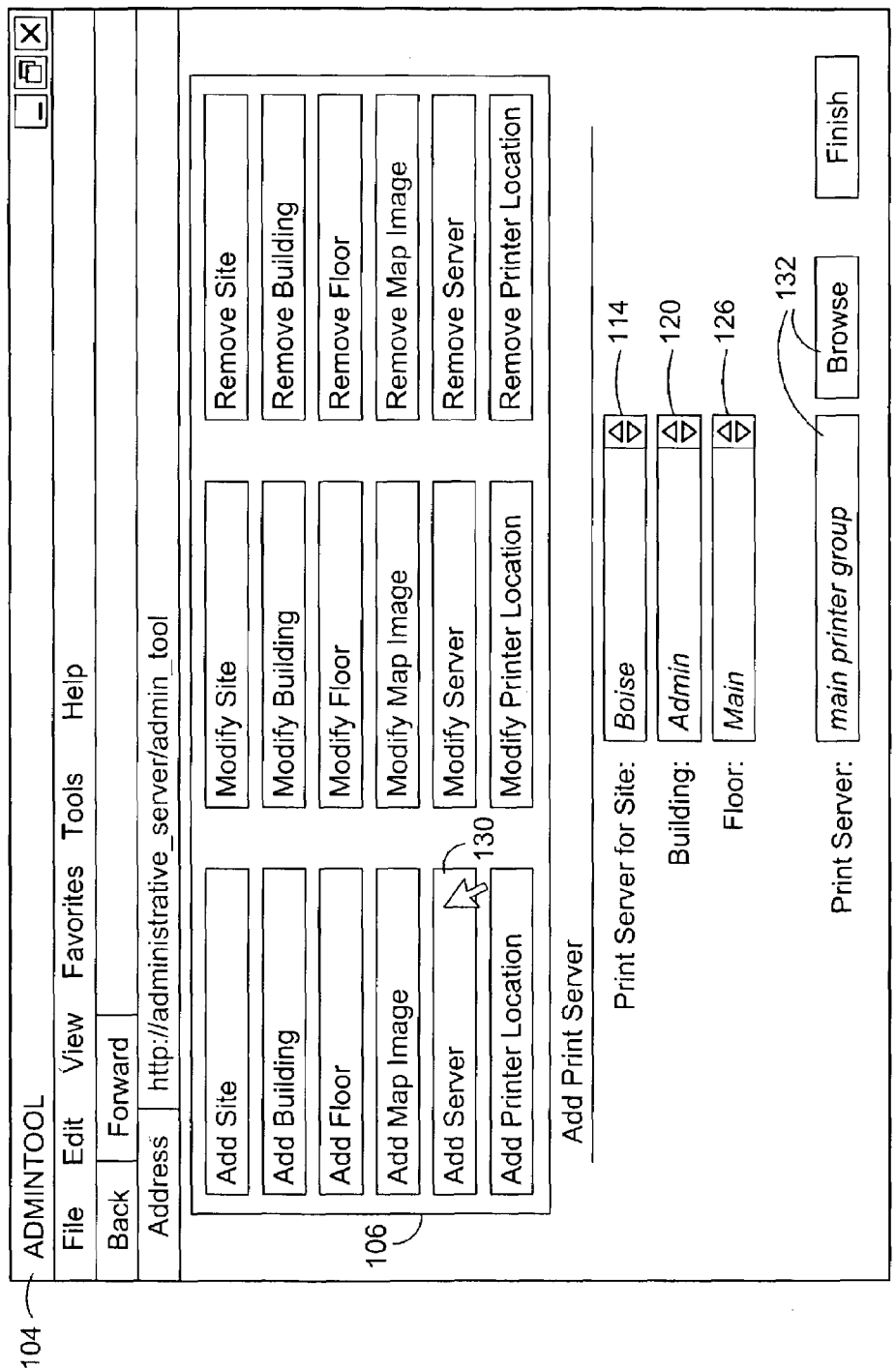

In FIG. 13, add server control 130 has been selected. In response, admin interface engine 54 presented interface controls 114, 120, 126, and 132 for identifying a print server. More specifically, interface controls 132 allow the identification of a print server to be associated with a multilevel identifier assembled from level data identified or selected using interface controls 114, 120, and 126.

Figure 14:
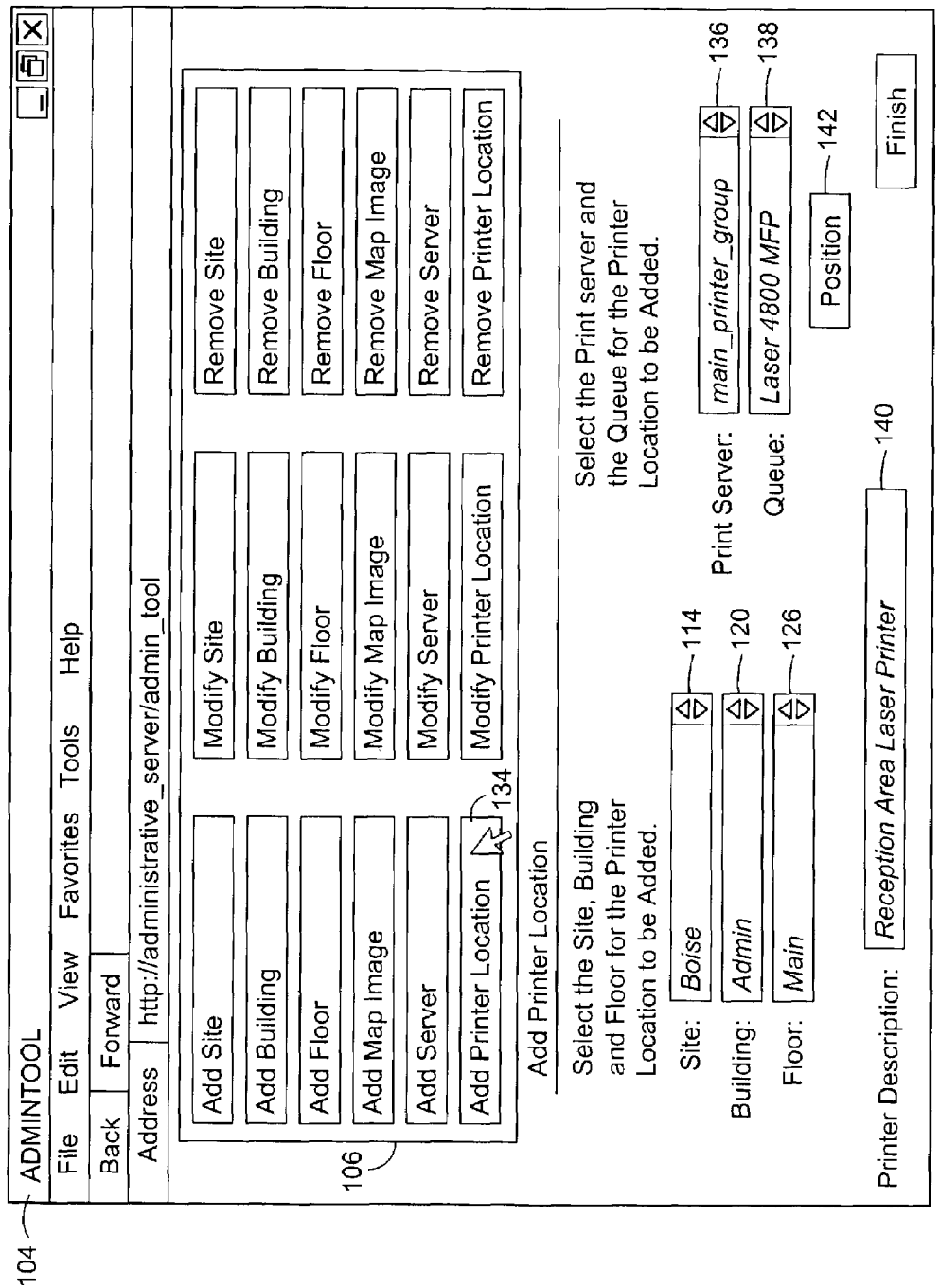

Referring to FIG. 14, add printer location 134 has been selected. In response, admin interface engine 52 presented interface controls 114, 120, 126, and 136-142. Resource interface 54 has identified print queues supplied by a print server identified using interface control 136. Interface control 138 allows selection of an identified print queue to be associated with a multilevel identifier assembled from level data selected using interface controls 114, 120, and 126. Interface control 140 allows the entry of text to be associated with the identified print queue. The text, for example, can identify the exact position of an image forming device associated with the identified print queue. Interface control 142 can be selected to identify a position of the image forming device in a map image associated with a multilevel identifier assembled from level data selected using interface controls 114, 120, and 126. With the print queue selected, installation file writer 56 can generate an installation file for the print queue, and resource interface can identify resource attribute data for the print queue that includes attribute data for the image forming device associated with the print queue.

Figure 15:
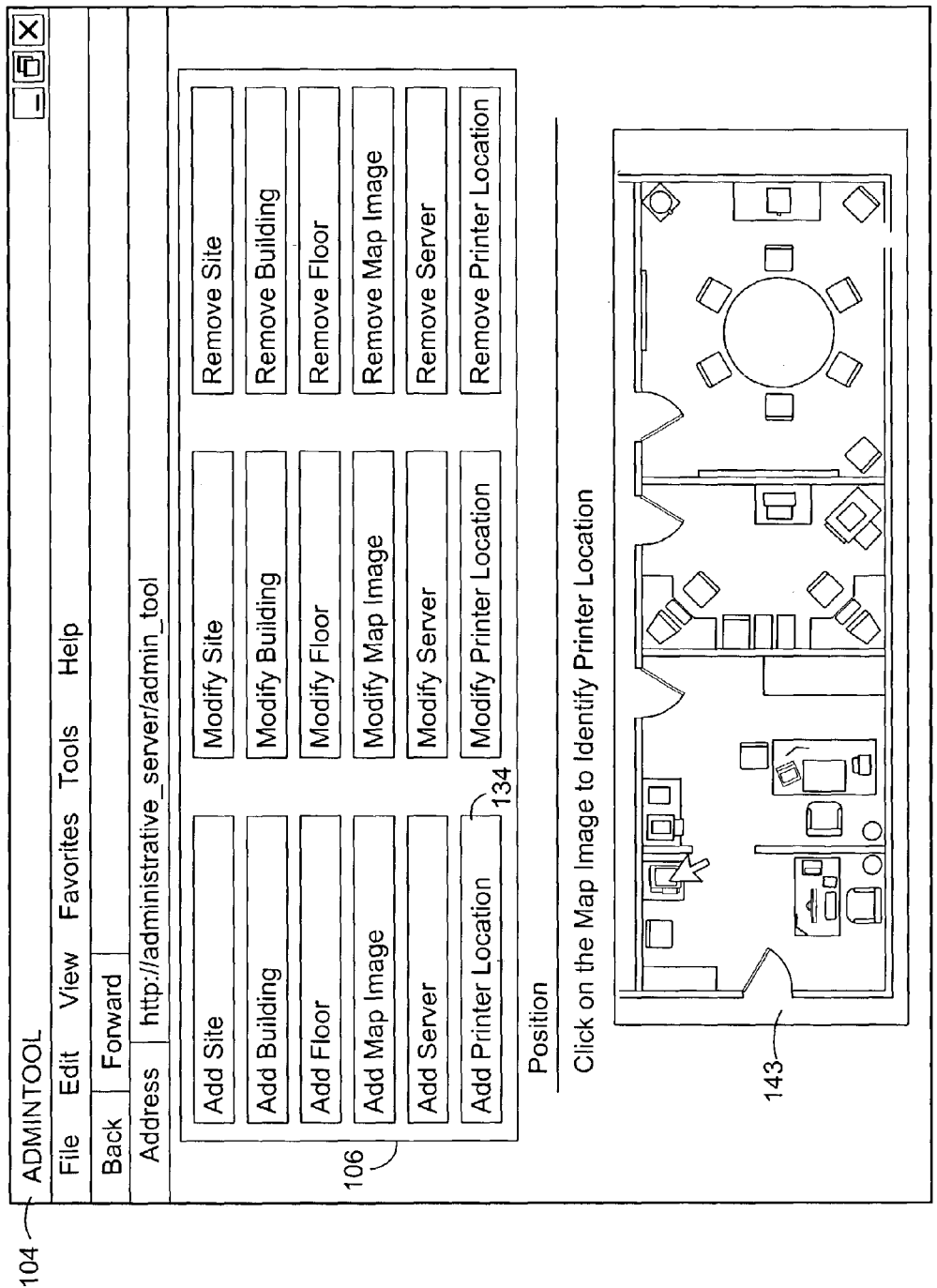

FIG. 15 includes interface control 143 presented by admin interface engine 52 in response to a selection of interface control 142 shown in FIG. 14. Interface control 143 is a map image associated with a multilevel identifier assembled from level data selected using interface controls 114, 120, and 126.

Highlighting a window or clicking a location corresponding to a location of an image forming device returns map image coordinates. Those coordinates can be used to position a link to the installation file for the print queue associated with the image forming device.

In response to selections made using interface controls 106-143 in FIGS. 8-15, database populator 58 adds to database 46, an entry 68 (FIG. 4) containing a multilevel identifier for a selected print queue, resource attribute data corresponding to the print queue, and data identifying the installation file for the print queue. The data identifying the installation file can include a link to the installation file, a link to a map image and map image coordinates for positioning the link to the installation file. With entry 68 added, the print queue has been prepared for vending.

Figure 16:
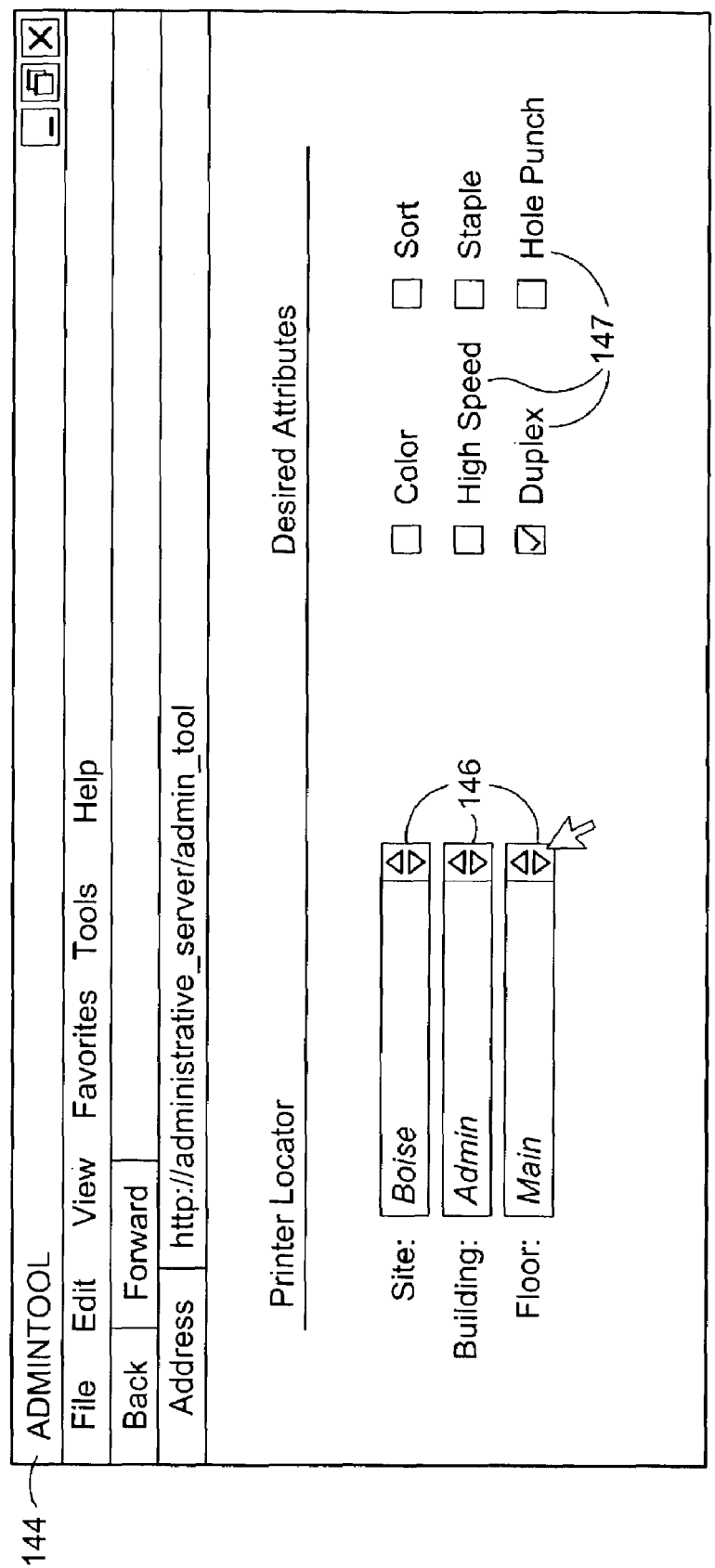
Figure 18:
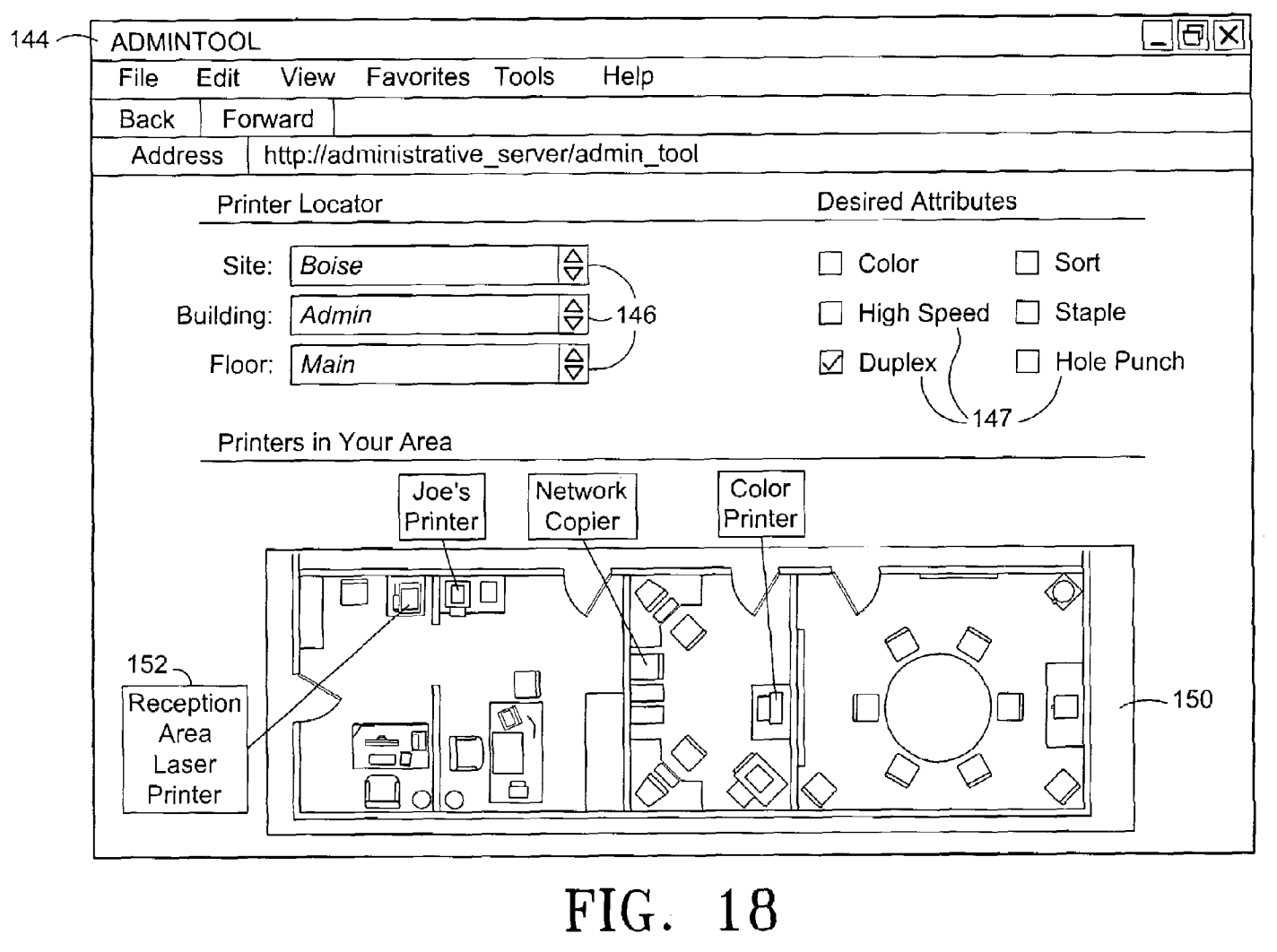

FIGS. 16-18 show various instances of client tool interface 144 used to vend a print queue. Starting with FIG. 16, client tool interface 144 includes interface controls 146 and 147. Interface controls 146 are used to select level data. Interface controls 147 are used to enter desired attribute data. In this case, level data for the MAIN floor in the ADMIN building at the BOISE site have been selected using interface controls 146. Desired attribute data relating to duplexing has been selected using interface controls 147. Referring back to FIG. 3, client tool interface 144 is presented to client 38 by client interface engine 62. Client 38 can then return selections entered through client tool interface 144.

Database reader 64 can locate within database 46 a set of entries 68 each containing a multilevel identifier matching the level data selected using interface controls 146. From that set of entries 68, database reader 64 can identify a subset of entries containing resource attribute data consistent with the desired attribute data selected using interface controls 147. From the subset of entries, database reader 64 can, from each entry, acquire data identifying an installation file.

Referring now to FIG. 17, client interface engine 62 has presented interface controls 148 for accessing an installation file identified by an entry 68 in that subset. In this example, the subset contained only one entry 68. Using that data identifying the installation file from that entry, client interface engine 62 presented interface control 148 for accessing the installation file. Interface control 148, in this example, is a link to the installation file.

Referring to FIG. 18, instead of presenting interface control 148 (shown in FIG. 17), client interface engine 62 has presented interface control 150—a map image. Included in interface control 150 is link 152 to the installation file. In this case the single entry 68 in the subset located by database reader also contained data identifying the map image and as well as coordinates for positioning the link to the installation file. The installation file can be accessed by selecting link 152.

CONCLUSION

The present invention has been shown and described with reference to the foregoing exemplary embodiments. It is to be understood, however, that other forms, details, and embodiments may be made without departing from the spirit and scope of the invention that is defined in the following claims.

What is claimed is:

1. A computer readable medium having computer executable instructions for:
presenting interface controls for entering user level data and desired attribute data;
receiving user level data and desired attribute data entered through the interface controls;
locating a multilevel identifier associated with resource attribute data and an installation file for a network resource; and
presenting, using data identifying the installation file, interface controls for accessing the installation file if the multilevel identifier matches the user level data and the resource attribute data is consistent with the desired attribute data;
wherein the network resource is a print queue and the resource attribute data is data identifying one or more attributes of the print queue and/or an image forming device associated with the print queue.

2. The medium of claim 1, having further instructions for determining if the network resource has been previously installed and wherein the instructions for presenting the interface control for accessing the installation file include instructions for presenting the interface control only if it is determined that the network resource has not been previously installed.

3. The medium of claim 1, wherein the data identifying the installation file is a link to the installation file, and wherein the instructions for presenting interface controls for accessing the installation file include instructions for presenting the link.

4. The medium of claim 3, wherein the instructions for presenting the link include instructions for presenting a map image of a physical location corresponding to the multilevel identifier, the link being included in the map image.

5. A computer readable medium having computer executable instructions for:
presenting interface controls for entering user level data and desired attribute data;
receiving user level data and desired attribute data entered through the interface controls;
locating a multilevel identifier associated with print attribute data for a print queue and/or an image forming device associated with the print queue and data identifying an installation file for enabling use of the image forming device associated with the print queue; and
presenting, using the data identifying the installation file, interface controls for accessing the installation file if the user level data matches the multilevel identifier and the desired attribute data is consistent with the print attribute data.

6. A computer readable medium having computer executable instructions for:
reading a database with a plurality of entries, each entry containing a multilevel identifier associated with data resource attribute data for a network resource and data identifying an installation file for the network resource;
presenting interface controls for entering user level data and desired attribute data;
receiving user level data and desired attribute date entered through the interface controls;
identifying each entry, if any, that contains a multilevel identifier matching user level data and resource attribute data consistent with the desired attribute data; and
presenting, for each identified entry, interface controls for accessing the installation file identified by that entry;
wherein at least one of the network resources is a print queue and at least some of the resource attribute data is data identifying one or more attributes of the print queue and/or an image forming device associated with the print queue.

7. The medium of claim 6, wherein the data identifying the installation file in each entry is a link to that installation file, and wherein the instructions for presenting interface controls for accessing the installation file include instructions for presenting a map image of a physical location corresponding to the multilevel identifier in each identified entry and wherein links from each identified entry are included in the map image.

8. A method for vending a network resource, comprising:
causing a first physical computer to present interface controls for entering user level data and desired attribute data to a second physical computer;
receiving, from the second physical computer, user level data and desired attribute data entered through the interface controls;
locating a multilevel identifier associated with resource attribute data and data identifying an installation file for the network resource; and
causing the first physical computer to present, using data identifying the installation file, interface controls for accessing the installation file to the second physical computer if the user level data matches the multilevel identifier and the desired attribute data is consistent with the resource attribute data;
wherein the network resource is a print queue and the resource attribute data is data identifying one or more attributes of the print queue and/or an image forming device associated with the print queue.

9. The method of claim 8, further comprising determining if the network resource has been previously installed and wherein presenting the interface control for accessing the installation file occurs only if it is determined that the network resource has not been previously installed.

10. The method of claim 8, wherein the data identifying the installation file is a link to the installation file, and wherein presenting interface controls for accessing the installation file includes presenting the link.

11. The method of claim 10, wherein presenting the link includes presenting a map image of a physical location corresponding to the multilevel identifier, the link being included in the map image.

12. A method for vending network resources, comprising:
providing a database with a plurality of entries, each entry containing a multilevel identifier associated with resource attribute data for a network resource and data identifying an installation file for the network resource;
causing a first physical computer to present interface controls for entering user level data and desired attribute data; to a second physical computer;
receiving, from the second physical computer, user level data and desired attribute date entered through the interface controls;
identifying each entry, if any, that contains a multilevel identifier matching user level data and resource attribute data consistent with the desired attribute data; and
causing the first physical computer to present to the second physical computer, for each identified entry, interface controls for accessing the installation file identified by that entry;
wherein at least some of the network resources are print queues and at least some of the resource attribute data is data identifying one or more attributes of the print queues and/or image forming devices associated with the print queues.

13. The method of claim 12, wherein the data identifying the installation file in each entry is a link to that installation file.

14. The method of claim 13, wherein presenting, for each identified entry, interface controls for accessing the installation file identified by that entry includes presenting a map image of a physical location corresponding to the multilevel identifier in each identified entry, links from each identified entry being included in the map image.

15. A system for vending a network resource, comprising:
a physical memory having programs stored thereon and a physical processor configured to execute the programs, the programs including:
an interface engine operable to present interface controls for entering user level data and desired attribute data; and
a database reader operable to locate in a database an entry containing, data identifying an installation file for a network resource, a multilevel identifier matching user level data entered through the interface controls, the entry also containing resource attribute data consistent with desired attribute data entered through the interface controls; and
the interface engine being further operable to present, using data identifying the installation file from the identified entry, interface controls for accessing the installation file;
wherein the network resource is a print queue and the resource attribute data is data identifying one or more attributes of the print queue and/or an image forming device associated with the print queue.

16. The system of claim 15, further comprising an installation tracker operable to determine if the network resource has been previously installed and wherein the interface engine is operable to refrain from presenting the interface control for accessing the installation file if it is determined that the network resource has been previously installed.

17. The system of claim 15, wherein the data identifying the installation file is a link to the installation file, and wherein the interface engine is operable to present the link.

18. The system of claim 17, wherein the interface engine is operable to present the link by presenting a map image of a physical location corresponding to the multilevel identifier, the link being included in the map image.

19. A system for vending network printing resources, comprising:
a physical memory having programs and data stored thereon and a physical processor configured to execute the programs, the programs and data including:
a database with a plurality of entries, each entry containing a multilevel identifier associated with print attribute data and data identifying an installation file for the network printing resource;
an interface engine operable to present interface controls for entering user level data and desired attribute data;
a database reader operable to locate in the database entries each containing a multilevel identifier matching user level data entered through the interface controls and resource attribute data consistent with desired attribute data entered through the interface controls; and
the interface engine being further operable to present, for each identified entry, if any, interface controls for accessing the installation file identified by that entry;
wherein at least some of the network resources are print queues and at least some of the resource attribute data is data identifying one or more attributes of the print queues and/or image forming devices associated with the print queues.

* * * * *

UNITED STATES PATENT AND TRADEMARK OFFICE
CERTIFICATE OF CORRECTION

| | | |
|---|---|---|
| PATENT NO. | : 7,558,855 B2 | Page 1 of 1 |
| APPLICATION NO. | : 10/458487 | |
| DATED | : July 7, 2009 | |
| INVENTOR(S) | : Anthony Valladares et al. | |

It is certified that error appears in the above-identified patent and that said Letters Patent is hereby corrected as shown below:

In column 12, line 52, in Claim 6, delete "date" and insert -- data --, therefor.

In column 13, line 47, in Claim 12, delete "date" and insert -- data --, therefor.

Signed and Sealed this

Thirty-first Day of August, 2010

David J. Kappos
*Director of the United States Patent and Trademark Office*